US007183338B1

(12) United States Patent  
Warren

(10) Patent No.: US 7,183,338 B1
(45) Date of Patent: Feb. 27, 2007

(54) TILE GROUT

(75) Inventor: Christopher Warren, Columbia, MD (US)

(73) Assignee: Starquartz Industries, Inc., Baltimore, MD (US)

( * ) Notice: Subject to any disclaimer, the term of this patent is extended or adjusted under 35 U.S.C. 154(b) by 277 days.

(21) Appl. No.: 10/791,039

(22) Filed: Mar. 2, 2004

Related U.S. Application Data

(60) Provisional application No. 60/451,454, filed on Mar. 4, 2003.

(51) Int. Cl.
*B32B 27/38* (2006.01)
*B32B 5/14* (2006.01)

(52) U.S. Cl. .......................... 524/3; 524/547; 524/493; 524/425; 428/413; 428/423.1; 428/426; 428/500; 264/31; 106/737; 106/738

(58) Field of Classification Search ............... 52/309.1, 52/309.3, 309.4, 309.9, 309.12, 309.17, 389; 526/328.5, 273, 282, 332; 524/3, 547; 428/426, 428/500, 413, 423.1; 264/DIG. 31; 106/713, 106/737, 738, 719, 493, 425
See application file for complete search history.

(56) References Cited

U.S. PATENT DOCUMENTS

| 3,372,083 | A | * | 3/1968 | Evans et al. ................. 428/149 |
|---|---|---|---|---|
| 3,386,944 | A | * | 6/1968 | Blomeyer .................... 524/706 |
| 3,979,540 | A | * | 9/1976 | Moffett ........................ 428/159 |
| 3,993,798 | A | * | 11/1976 | Brose et al. ................. 427/500 |
| 4,080,353 | A | * | 3/1978 | Monte et al. ................ 523/202 |
| 4,152,311 | A | * | 5/1979 | Monte et al. ................ 523/417 |
| 4,261,913 | A | * | 4/1981 | Monte et al. .................. 556/13 |
| 4,296,207 | A | | 10/1981 | Siegmund |
| 4,348,447 | A | * | 9/1982 | Miller et al. ................. 428/149 |
| 4,405,657 | A | * | 9/1983 | Miller et al. ................. 427/520 |
| 5,059,471 | A | | 10/1991 | McNally |
| 5,362,322 | A | | 11/1994 | Johansen, Jr. |
| 5,536,775 | A | * | 7/1996 | Curatolo et al. ............. 525/530 |
| 5,569,696 | A | | 10/1996 | Abramson |
| 5,663,267 | A | * | 9/1997 | Frost ........................ 526/328.5 |
| 5,678,165 | A | | 10/1997 | Wu |
| 5,968,257 | A | | 10/1999 | Ahrens |
| 6,264,737 | B1 | * | 7/2001 | Liotta et al. ................. 106/724 |
| 6,387,504 | B1 | * | 5/2002 | Mushovic .................... 428/413 |
| 6,403,004 | B1 | * | 6/2002 | Stecker ........................ 264/139 |
| 6,783,799 | B1 | * | 8/2004 | Goodson ..................... 427/140 |
| 7,005,462 | B2 | * | 2/2006 | Schad et al. .................... 524/3 |

* cited by examiner

*Primary Examiner*—Jeanette Chapman
(74) *Attorney, Agent, or Firm*—Jansson, Shupe & Munger, Ltd.

(57) ABSTRACT

A durable, stain resistant tile grout comprised of naturally rounded quartz particles and water-borne polyurethane. The naturally rounded quartz particles are permanently colored and encapsulated within the water-borne polyurethane, which remains transparent and shows the permanent color of the quartz particles.

19 Claims, No Drawings

TILE GROUT

REFERENCE TO RELATED APPLICATIONS

The applicant claims priority of this application based on the provisional patent application No. 60/451,454, for Tile Grout, filed 4 Mar. 2003.

NON-PUBLICATION

The applicant requests, pursuant to 35 USC 122(b)(2)(B)(i), that this application not be published.

BACKGROUND

The present invention relates to an improved formulation for tile grout. Materials used in flooring systems must be durable. Flooring systems designed for use in commercial and industrial applications are designed to be especially durable. Although there are many types of flooring systems which are applied in liquid form and allowed to cure, tile floors are also being used in commercial and industrial areas. Hard tile material, such as ceramic, can produce a durable floor, which is also attractive. This type of floor finds use in many applications such as showrooms for large and heavy items. A ceramic tile floor requires a grout which is strong and durable. The grout must also be flexible to absorb pressure due to movement of the tile and shock loads delivered to the floor. In commercial and industrial applications, the flooring system, including the grout, must resist staining and withstand washing with detergent. Often, it is desirable to have the grout pigmented to match or complement the color of the flooring tile. It is important that the coloring, of the grout, be resistant to fading from use and from cleaning.

The need to provide grout in various shades of color to add an attractive look to the flooring system has been addressed by adding pigment to the grout mixture. The U.S. Pat. No. 5,362,322, to Johansen discloses the use of color pigments in an epoxy base grout. The product is intended to reduce damage due to vibration. While ceramic tile has a desirable hard surface, grout, which is intended to be flexible, also tends to be porous and is susceptible to staining. The U.S. Pat. No. 5,569,696, to Abramson discloses a stain resistant grout, for ceramic tile, composed of acrylic latex, aliphatic urethane and paraffin, which is colored with pigment. This product can be used alone or combined with portland cement. The exposure of grout to detergent and petro-chemicals causes the pigment near the surface of the grout to be washed out or stained. The loss of color, at the surface detracts from the appearance of the floor and the penetration of the detergent and petro-chemicals can cause the premature deterioration of the grout.

In addition, epoxy base grout is a two part system. The parts must be combined, in an appropriate ratio and mixed immediately prior to application. Once the parts are combined, the grout will cure in a relatively short period of time. Grout which is mixed and not used must be wasted. Likewise, grout which may be combined with another material, such as portland cement, requires mixing, at the work site, if another material is to be added. Typically, another material is needed for any application where the grout must have an amount of stiffness to prevent migration before curing. A tiled wall is an example of such an application.

There is a need for a one part, stain resistant, colorfast colored grout, which can be used with ceramic tile in commercial and industrial applications, which can be applied directly from a container, without mixing.

SUMMARY OF THE INVENTION

It is an object of the present invention to provide a grout which can be produced in a variety of colors, including speckled patterns, and resist discoloration, fading and staining, when exposed to heavy use including exposure to various chemicals and detergents. It is another object of the invention to provide a grout which is flexible but retains a firm bond with tile, in applications where a relatively thin line of grout is used. It is a further object of the invention to provide a single part grout.

In accordance with the above stated objects, the grout, of the present invention comprises naturally rounded quartz particles, which have been permanently pigmented by firing or by ceramic ally bonding. The quartz particles are sized between approximately 50 and 140 mesh. The quartz particles are combined with water-borne polyurethane. The quartz particles become encapsulated within the polyurethane, which is largely transparent allowing the color of the quartz to show as the color of the grout as it appears to an observer. The quart particles provide strength and provide a filler, which allows the polyurethane to cure properly when applied in the thickness of the material necessary to grout flooring, or other tile. The polyurethane provides the level of flexibility needed to cushion tile against breakage from shifting and shock loads received by the floor.

The grout of the present invention may be applied after tiles have been affixed to a sub-floor with adhesive. Typically, the tiles are positioned in a pattern leaving a uniform measure of space between the tiles to allow for lines of grout to be applied so as to completely fill the spaces. The grout is applied by any of several known means. The grout material, which is inadvertently deposited on the upward facing surface of the tiles, during the application process, can be easily removed by wiping with a solution of water and a small amount of delimalene additive.

Another version of the present invention comprises the same naturally rounded quartz particles and a catalyzed, water-borne polyurethane, which is catalyzed with isocyanate. The use of the catalyzed water-borne polyurethane produces a more durable grout and is more suitable for applications in areas where use is particularly heavy or where exposure to harsh chemicals is frequent.

DETAILED DESCRIPTION OF THE PREFERRED EMBODIMENT

The grout of the present invention is comprised of naturally rounded quartz particles and a polyurethane component. The quartz particles are sized so as to form a workable mixture, when mixed with polyurethane. It is desirable that the particles be sufficiently small so that the grout can be worked into relatively narrow grout lines for certain flooring applications. It is also desirable that the quartz particles be sufficiently large so that they do not become too densely packed and inhibit the curing of the polyurethane. Quartz particles of approximately 50–140 mesh are of suitable size. Quartz particles of this size are naturally rounded. The quartz particles are colored by permanent dying. The Color Quartz®, fine grade, by 3M Company is a suitable naturally rounded colored quartz.

The polyurethane component is comprised of a clear drying water-borne polyurethane and a thickener, which is added to obtain a workable consistency. The grout can be applied, worked into grout lines between tiles and smoothed. It will remain in place and cure over a period of approximately twenty-four hours. The water-borne polyurethane produce, W-191®, by C.F.I. Company is suitable. The latex thickener may be obtained from C.F.I. Company as well. Approximately 3 ounces of latex thickener are added to 5 gallons of the polyurethane to produce the polyurethane component of the present invention.

Another version of the present invention is provided for applications where use will be extremely heavy or where exposure to harsh chemicals is likely. This version includes the addition of isocyanate in the proportion of approximately 20–50%, by volume, to the polyurethane component. The addition of isocyanate will improve the capacity of the grout to resist penetration by petro-chemicals and detergents.

The quartz particles and the polyurethane component are combined in a ratio of approximately 73% quartz particles to 27% polyurethane component, by weight. The grout is thoroughly mixed to distribute the quartz particles throughout the polyurethane. The grout can be applied to the open spaces between flooring tiles, which have been affixed to a subfloor. The excess grout, of the present invention can be removed from the upward facing surface of the tiles by wiping with a mixture of water and a small amount of delimaline additive. The grout is also suitable for application on walls. After curing, the polyurethane will remain clear and the color quartz will give the grout an appearance of uniform color, according to the color of the quartz, which may be selected to be any desired shade. Additionally, a combination of colors of quartz may be used to produce a speckled effect, which cannot be obtained by the methods of the prior art which use pigment to produce the color of grout. The color quartz particles are encapsulated by the polyurethane and are thereby protected from fading and washing out, giving the grout of the present invention a permanent coloration.

It will be apparent to those skilled in the art that variations in the composition of components can be made without departing from the essence of the invention. For example, a latex or latex based component could be substituted for the water-borne polyurethane or combined with it. Such a product would have inferior chemical resistant properties but would be suitable for many applications.

I claim:

1. A tile grout comprising a one-part admixture of quartz particles, water-borne polyurethane and a thickener, the quartz particles, water-borne polyurethane and thickener being present in sufficient amounts to provide the tile grout with a workable consistency.

2. The tile grout of claim 1 comprising:
   about 73% by weight quartz particles; and
   about 27% by weight water-borne polyurethane.

3. The tile grout of claim 1 wherein the quartz particles are pigmented.

4. The tile grout of claim 1 wherein the quartz particles are sized between approximately 50 and 140 mesh.

5. The tile grout of claim 1 wherein the thickener is a latex thickener.

6. The tile grout of claim 1 further comprising an isocyanate catalyst.

7. A method for applying grout between spaced-apart tiles comprising providing the tile grout comprising a one-part admixture of quartz particles, water-borne polyurethane and a thickener, the quartz particles, water-borne polyurethane and thickener being present in sufficient amounts to provide the tile grout with a workable consistency and applying a tile grout within a joint between the tiles.

8. The method of claim 7 wherein the tile grout comprises:
   about 73% by weight quartz particles; and
   about 27% by weight water-borne polyurethane.

9. The method of claim 7 wherein the quartz particles are pigmented.

10. The method of claim 7 wherein the quartz particles are sized between approximately 50 and 140 mesh.

11. The method of claim 7 wherein the thickener is a latex thickener.

12. The method of claim 7 wherein the tile grout further comprises an isocyanate catalyst.

13. A tile grout comprising a one-part admixture of quartz particles and water-borne polyurethane, the quartz particles being sized so as to form a workable tile grout when combined with the water-borne polyurethane.

14. The tile grout of claim 13 further comprising a thickener present in sufficient amounts to provide the tile grout with a workable consistency.

15. The tile grout of claim 14 wherein the thickener is a latex thickener.

16. The tile grout of claim 13 wherein the tile grout comprises:
   about 73% by weight quartz particles; and
   about 27% by weight water-borne polyurethane.

17. The tile grout of claim 13 wherein the quartz particles are pigmented.

18. The tile grout of claim 13 wherein the quartz particles are sized between approximately 50 and 140 mesh.

19. The tile grout of claim 13 further comprising an isocyanate catalyst.

* * * * *

UNITED STATES PATENT AND TRADEMARK OFFICE
CERTIFICATE OF CORRECTION

PATENT NO. : 7,183,338 B1  Page 1 of 1
APPLICATION NO. : 10/791039
DATED : February 27, 2007
INVENTOR(S) : Warren It is certified that error appears in the above-identified patent and that said Letters Patent is hereby corrected as shown below:

In column 2, line 41, delete "delimalene" and insert --delimaline--.

In column 4, lines 12 through 18, delete claim 7 and insert the following:

--7. A method for applying grout between spaced-apart tiles comprising applying a tile grout within a joint between tiles, the tile grout comprising a one-part admixture of quartz particles, water-borne polyurethane and a thickener, the quartz particles, water-borne polyurethane and thickener being present in sufficient amounts to provide the tile grout with a workable consistency.--

Signed and Sealed this

Fifteenth Day of April, 2008

JON W. DUDAS
*Director of the United States Patent and Trademark Office*